(12) United States Patent
Kim et al.

(10) Patent No.: US 6,940,510 B2
(45) Date of Patent: Sep. 6, 2005

(54) SYSTEM AND METHOD FOR DISPLAYING FONT IN A WIRELESS TELEPHONE

(75) Inventors: Yong-Hyun Kim, Kumi (KR); Young-Ha Yoon, Kumi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/606,807

(22) Filed: Jun. 27, 2003

(65) Prior Publication Data

US 2004/0027351 A1 Feb. 12, 2004

(30) Foreign Application Priority Data

Aug. 6, 2002 (KR) .................................. 10-2002-0046291

(51) Int. Cl.[7] .................................................. G09G 5/24
(52) U.S. Cl. ...................................... 345/471; 455/566
(58) Field of Search ................................. 345/626, 636, 345/471; 455/566

(56) References Cited

U.S. PATENT DOCUMENTS

2003/0202697 A1 * 10/2003 Simard et al. ............... 382/195

FOREIGN PATENT DOCUMENTS

EP 0376271 7/1990

OTHER PUBLICATIONS

Simpson, Alan, "Mastering WordPerfect 5.1 & 5.2 for Windows", Sybex, Inc., 1993, pp. 170, 954.*
"The Authoritative Dictionary of IEEE Standards Terms, 7th edition", IEEE Press, Dec. 2000, pp. 448.*

* cited by examiner

Primary Examiner—Michael Razavi
Assistant Examiner—Michelle K. Lay
(74) Attorney, Agent, or Firm—Roylance, Abrams, Berdo & Goodman, L.L.P.

(57) ABSTRACT

A system and method for displaying font in a wireless telephone. The system and method employ the operations of converting base font data into converted font data, wherein the converted font data has a data bits equal in number to data bits of a background screen into which the converted font data will be transcribed; generating a mask for the converted font data; storing the converted font data and the mask in a memory of the wireless telephone; retrieving the mask stored in the memory. The system and method further employ the operations of executing an AND operation to logically AND the retrieved mask and the background screen to generate; a background screen base; retrieving the converted font data stored in the memory; executing an AND operation to logically AND the retrieved font data and a color data, thereby coloring the converted font data which are white data; and executing an OR operation to logically OR the background screen base and the colored converted font data in order to display a character on the background screen.

14 Claims, 5 Drawing Sheets

BACKGROUND SCREEN DATA (16 bit)

FONT DATA (1 bit)

FONT DATA (16 bit)

MASK

BACKGROUND SCREEN BASE

COLORED FONT DATA

CHARACTER DISPLAYED ON BACKGROUND SCREEN

US 6,940,510 B2

SYSTEM AND METHOD FOR DISPLAYING FONT IN A WIRELESS TELEPHONE

PRIORITY

This application claims priority under 35 U.S.C. § 119 to an application entitled "METHOD FOR DISPLAYING FONT IN WIRELESS TELEPHONE", filed in the Korean Intellectual Property Office on Aug. 6, 2002 and assigned Ser. No. 2002-46291, the contents of which are incorporated herein by reference.

BACKGROUND OF THE INVENTION

1. Field of the Invention

The present invention relates to a system and method for displaying font data, and more particularly to a system and method for displaying characters on background screens in wireless telephones, without lowering the performance of the wireless telephone. More specifically, the present invention relates to a system and method for reducing the number of font data bits so that the number of font data bits equals the number of background bits for the wireless telephone.

2. Description of the Related Art

Current wireless telephones process a large quantity of image data, which contain a variety of fonts with font variation such as inverted images and shading. Thus, current wireless telephones require the use of image compression technology to process data containing fonts and image data. Due to the amount of resources required, the various fonts and the large amount of image data requiring processing can deteriorate the performance of the wireless telephones.

In order to display one character on a display of the wireless telephone, all properties of the character are calculated into font data and calculations are performed for a large number of bits. For example, in order to have a "transparent effect", in which displayed characters are changed and a background picture is maintained, conventional wireless telephones perform calculations for a considerably large number of bits.

The following program, shows a process in which one bit font data is extracted as 16 bit font data in order to transcribe the one bit font data into a 16 bit-background screen data. As seen from the program, in extracting 16 bit font data from the one bit font data, 648 branch operations, 432 multiplication/division operations, 648 bit operations, and 216 modular operations are performed.

```
for(j = 0; j < lheight; j++)
{
    for(i = 0; 1 < lsize; 1++)
    {
        bit1 = (*(1pSource+(j/8*1size)+i) >> (j%8)) & 1;
        if(bit1)
        {
            *1pTarget++ = 1fcolor;
        else
            *1pTarget++ = 1bcolor;
        }
}
```

SUMMARY OF THE INVENTION

It is an object of the present invention to provide a system and method for quickly displaying characters on a background screen in a wireless telephone, without lowering the performance of the wireless telephone.

In order to substantially accomplish this and other objects, a system and method is provided for displaying a font in a wireless telephone. The system and method employ the operations of converting font data into converted font data, wherein the converted font data has data bits equal in number to data bits of a background screen into which the converted font data will be transcribed; generating a mask for the converted font data; and storing the converted font data and the mask in a memory of the wireless telephone such as a cache. The system and method further perform the operations of retrieving the mask stored in the memory performing an AND operation to logically "AND" the retrieved mask and the background screen, thereby generating a background screen base; retrieving the converted font data stored in the memory; performing an AND operation to logically "AND" the retrieved font data and a color data, thereby coloring the converted font data which are white data; and executing an OR operation to logically "OR" the background screen base and the colored converted font data in order to display a character in the background screen.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Several embodiments of the present invention will now be described in detail with reference to the accompanying drawings. Also, a detailed description of known functions and configurations have been omitted for conciseness.

Figure 1:
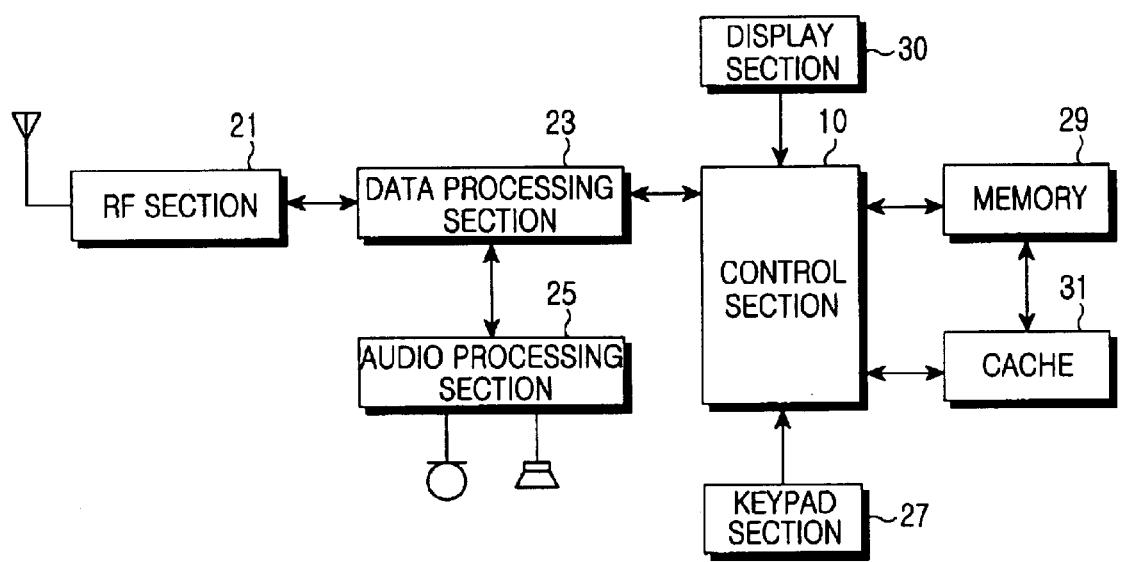
FIG. 1 shows an example of components for a wireless telephone in accordance with an embodiment of the present invention.

FIG. 1 shows an example of components for a wireless telephone in accordance with an embodiment of the present invention. Specifically, the wireless telephone in FIG. 1 comprises a control section 10, a radio frequency (RF) section 21, a data processing section 23, an audio processing section 25, a keypad section 27, a memory 29, a display section 30, a cache 31, a speaker SP, a microphone MIC, and an antenna ANT. The RF section 21 performs the communication for the wireless telephone. The RF section 21 comprises a RF transmitter (not shown) for amplifying a signal being transmitted and increasing a frequency thereof, and a RF receiver (not shown) for low-noise amplifying a signal being received and decreasing the frequency thereof. The data processing section 23 includes a transmitter (not shown) for encoding and modulating the signal being transmitted and a receiver (not shown) for decoding and demodulating the received signal. That is, the data processing section 23 can comprise a MODEM and coder/decoder (CODEC).

In one embodiment of the invention, the audio processing section 25 regenerates the received audio signal outputted from the data processing section 23. In another embodiment of the invention, the audio-processing unit 25, transmits the audio signal from the MIC to the data processing section 23. In still another embodiment of the invention, when the wireless telephone is set to an absent mode, the wireless telephone transmits a preset user "absence-informing" message to a calling subscriber.

The keypad section 27 comprises keys for inputting numeral and character information and function keys for setting various functions.

The memory 29 can include a program memory and a data memory. In accordance with an embodiment of the invention, program memory can store programs for controlling the general operation of the wireless telephone and also programs for converting the font data into data having the same number of data bits as the background screen, and programs that also generate a mask for the converted font data having the same data bit as that of the background screen. Also, in accordance with an embodiment of the present invention, the memory 29 can store the base font data and the background screen data. Additionally, the data memory temporarily stores data generated while the programs are executed. The cache 31 stores the font data having the same number of data bits as that of the background screen with the mask for the font data. That is, at least one cache 31 is constructed in the wireless telephone, and each cache 31 stores the font data with the mask. Font data having the same number of data bits as the background screen implies data that represents display of a white color.

The control section 10 controls the general operation of the wireless telephone and can comprise the data processing section 23. Also, in accordance with an embodiment of the invention, the control section 10 executes an AND operation to logically "AND" the background screen data and the mask that was retrieved from the cache 31. The control section 10 also executes an AND operation to logically "AND" and the white color, and the font data for the white color that was retrieved from the cache 31. The control section 10 also executes an OR operation to logically "OR" the background screen base data and the colored font data.

The display section 30 displays messages, which occur during the program execution under the control of the control section 10 and a state of the user's key when executing a communicating function.

Referring to FIG. 1, if the user sets a transmit mode after executing a dialing operation via the keypad 27, the control section 10 detects the transmit mode and processes the received dialing information via the data processing section 23. The control section 10 converts the processed information into a RF signal via the RF section 21 and outputs the signal. If another subscriber generates a response signal, the RF section 21 and the data processing section 23 detect the response signal. An audio communication channel is then established by the audio processing section 25 allowing the user to execute the communication function. In addition, when an incoming call mode is set, the control section 10 detects the incoming call mode via the data processing section 23, and generates a ring signal via the audio processing section 25. If the called subscriber responds to the ring signal, the control section 10 detects the response and the audio communication channel is established by the audio processing section 25, wherein the called and calling parties have established an audio communication path to convey audio information. Also, if the user executes a standby mode or a character communication mode, the control section 10 displays on the display section 30 the character data that is processed via the data processing section 23. It will be appreciated by those skilled in the art that while audio communication is shown and described as an example for the transmit mode and the incoming mode, it is also possible to perform a data communication function which communicates packet data and image data without departing from the scope of the present invention.

An embodiment of the present invention will now be described for displaying a character on the background screen data of the wireless telephone. The control section 10 retrieves the base font data from the memory 29, converts the base font data into data having the same number of data bits as a background screen into which the converted font data is transcribed, and then generates a mask for the converted font data which have the same data bit as that of the background screen data. The control section 10 the converted font data, which have the same data bit as that of the background screen, and the mask in the cache 31. The control section 10 repeats the above sequence and stores the converted font data having the same data bit as that of the background screen and and the mask in at least one cache 31 according to each of the fonts. When the user selects a font being transcribed on the background screen data, the control section 10 retrieves the mask from the cache 31 in which the user selected font is stored. An AND operation is performed to logically "AND" the mask data and the background screen data to generate the background screen base. The control section 10 retrieves the mask from the cache 31 in which the user selected font is stored. An AND operation is performed to logically "AND" the font data for a white color and that for other colors in order to color the font data. The control section 10 then executes an OR operation to logically "OR" the background screen base and the colored font data, and the character of the selected font is transcribed on the background screen, and displayed on the display section 30.

Figure 2:
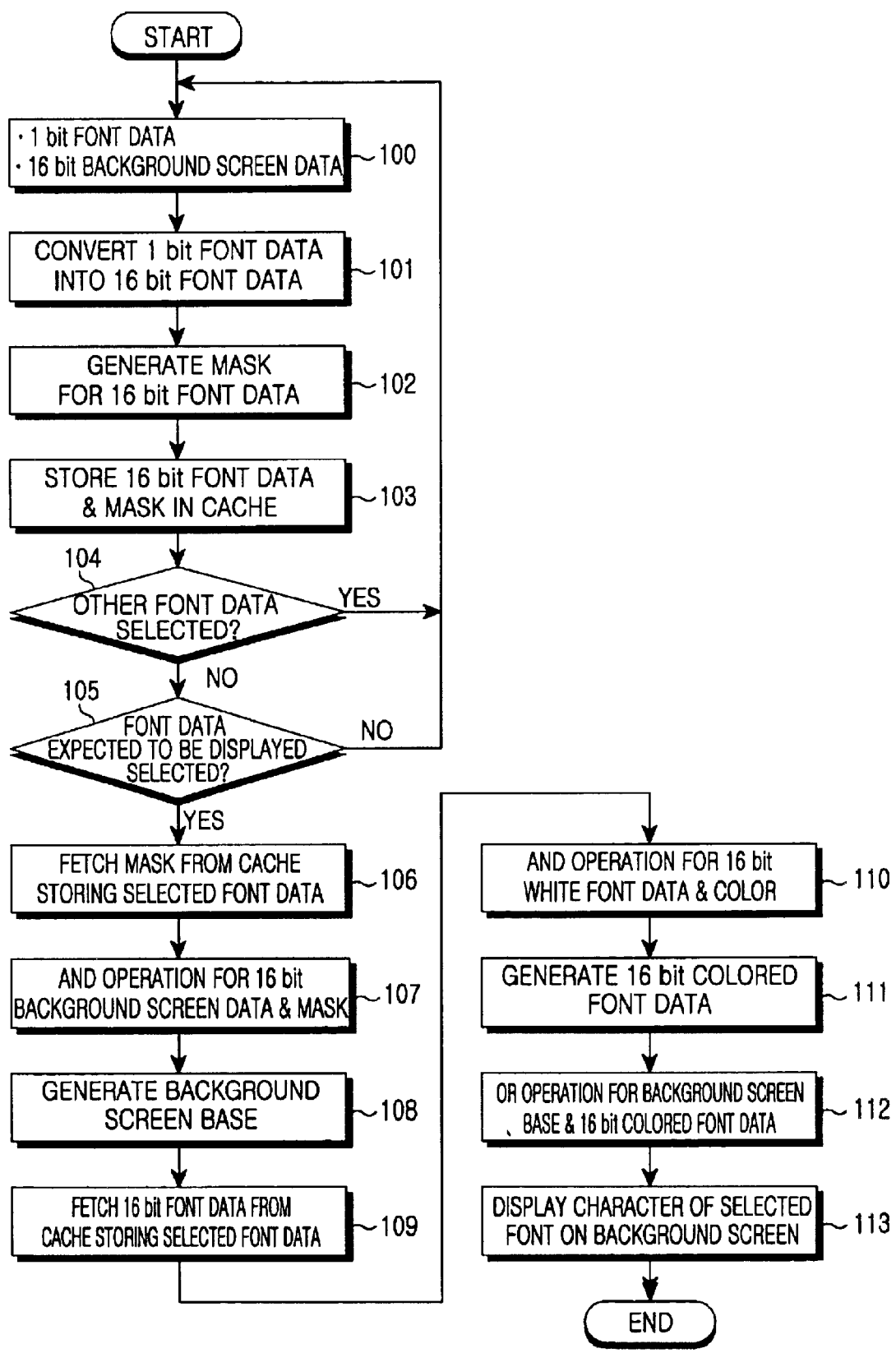
FIG. 2 is a flow chart showing an example of steps for displaying a character in a wireless telephone in accordance with an embodiment of the present invention.

FIG. 2 is a flow chart showing an example of steps for displaying characters in a wireless telephone in accordance with an embodiment of the present invention. FIG. 2 also shows a method for displaying a character for fonts such as that shown in FIG. 3b on the 16 bit background screen data of FIG. 3a.

An embodiment of the present invention will be described with reference to FIGS. 1, 2 and 3a to 3g which together show an example of the stages involved in displaying a character on a background screen in the wireless telephone. In step 100, base font data and background screen data are provided to the wireless telephone. In step 101, the control section 10 converts the base font data into the 16 bit data format of the background screen via the memory 29. The 16 bit font data has a white color. In step 102, the control section 10 generates a mask for the 16 bit font data produced at stage 101 through the memory 29. In step 103, the 16 bit font data and the mask are stored in the cache 31 under the control of the control section 10. In step 103, the control section 10 repeats steps 100 to 104, and stores the 16 bit font data and the mask generated in the caches according to each font.

Figure 3A:
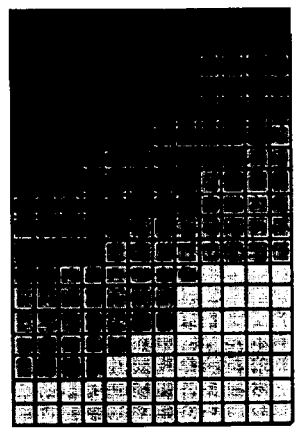
FIGS. 3a to 3g together show an example of the stages involved in displaying a character on a background screen in the wireless telephone in accordance with an embodiment of the present invention.

Specifically, in step 104, control section 10 detects when the process of storing in the caches according to each of the fonts is terminated. If the user selects a character of the font being displayed on the background screen data as shown in FIG. 3a, the control section 10 detects the selection in step 105, and sequentially searches the caches stored according to each of the fonts. If the user selects character data of the font as shown for example in FIG. 3b in step 105. The process proceeds to step 106.

Figure 3B:
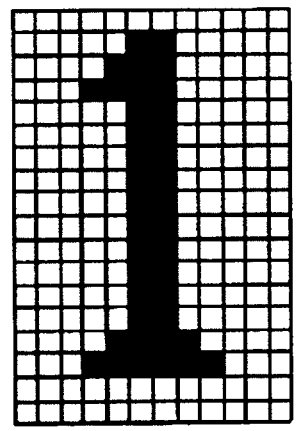
Figure 3C:
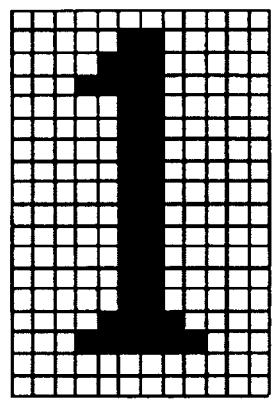
Figure 3D:
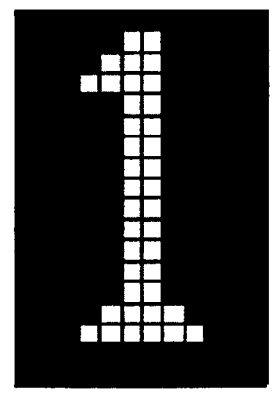
Figure 3E:
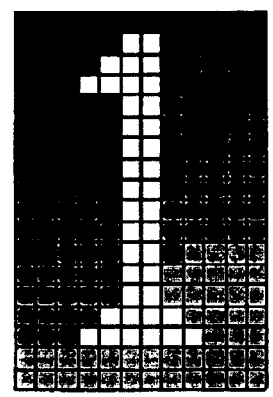
Figure 3F:
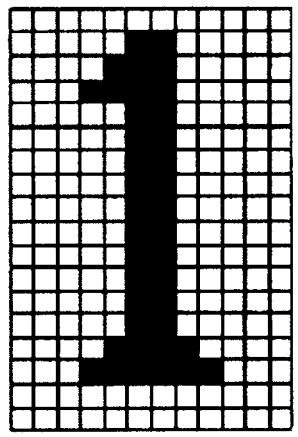
Figure 3G:
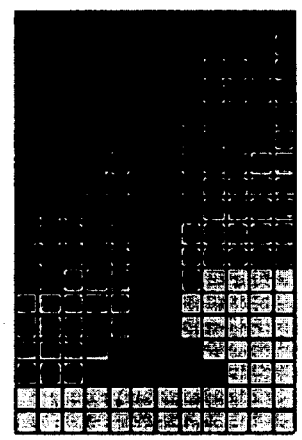

In step 106, the control section 10 retrieves a mask as shown in FIG. 3d from the cache in which the character data of the user selected font is stored. In step 107, the control section 10 retrieves the background screen data as shown in FIG. 3a from the memory 29, and executes an AND operation to logically "AND" the retrieved data and the mask data as shown in FIG. 3d. In step 108, the control section 10 generates the background screen base as shown, for example, in FIG. 3e. In step 109, the control section 10 retrieves the font data of the white color as shown, for example, in FIG. 3c from the cache in which the character data of the user selected font as shown in FIG. 3b is stored. The control section 10 executes an AND operation to logically "AND" the font data of the white color as shown in FIG. 3c and the color font in step 110. In step 111, the control section 10 generates the colored font data e.g., FIG. 3f. In step 112, the control section 10 executes an OR operation to logically "OR" the background screen base as shown in FIG. 3e that was generated in step 108, and the colored font data as shown in FIG. 3f that was generated in step 111. In step 113, the control section 10 displays the character data of the user selected font of FIG. 3b on the background screen of FIG. 3a as shown in FIG. 3g via the display section 30.

In accordance with an embodiment of the present invention, the caches are added between the base font data and the font data being actually displayed, enabling the character according to each of the fonts to be quickly displayed in the wireless telephone and improve performance.

While the invention has been shown and described with reference to certain preferred embodiment thereof, it will be understood by those skilled in the art that various changes in form and details may be made therein without departing from the spirit and scope of the invention as defined by the appended claims.

What is claimed is:

1. A method for displaying a font in a wireless telephone, the method comprising the steps of:
   converting base font data into converted font data, wherein the converted font data has data bits equal in number to data bits of a background screen into which the converted font data will be transcribed;
   generating a mask for the converted font data;
   storing the converted font data and the mask in a memory of the wireless telephone;
   retrieving the mask stored in the memory executing an AND operation to logically AND the retrieved mask and the background screen, thereby generating a background screen base;
   retrieving the converted font data stored in the memory of the wireless telephone, and executing an AND operation to logically AND the retrieved converted font data and a color data and
   executing an OR operation for the background screen base and the colored converted font data in order to display a character on the background screen.

2. The method according to claim 1, wherein the memory of the wireless telephone comprises at least one cache.

3. The method according to claim 2, wherein the converted font data and the mask are stored in the cache according to each one of a font type.

4. The method according to claim 1, wherein the converted font data and the mask are stored in the cache according to each one of a font type.

5. The method according to claim 1, wherein said converted font data comprises a white color.

6. The method according to claim 1, wherein said second step of retrieving further comprising:
   providing color to the converted font data.

7. The method according to claim 1, wherein the converted font comprises a character.

8. A computer readable medium of instructions for displaying a font in a wireless telephone, the computer readable medium of instructions comprising:
   a first set of instructions, adapted to control the wireless telephone to convert base font data into converted font data, wherein the converted font data has data bits equal in number to data bits of a background screen into which the converted font data will be transcribed;
   a second set of instructions, adapted to control the wireless telephone to generate a mask for the converted font data;
   a third set of instructions, adapted to control the wireless telephone to store the converted font data and the mask in a memory of the wireless telephone;
   a fourth set of instructions, adapted to control the wireless telephone to retrieve the mask stored in the memory and to execute AND operation to logically AND the retrieved mask and the background screen to generate a background screen base;
   a fifth set of instructions, adapted to control the wireless telephone to retrieve the converted font data stored in the memory of the wireless telephone and execute an AND operation to logically AND the retrieved converted font data and a color data to color the converted font data which are white data; and
   a sixth set of instructions, adapted to control the wireless telephone to execute an OR operation for the background screen base and the colored converted font data in order to display a character on the background screen.

9. A computer readable medium of instructions as claimed in claim 8, wherein the third set of instructions is adapted to control the wireless telephone to store the converted font data and the mask in at least one cache of the memory.

10. A computer readable medium of instructions as claimed in claim 9, wherein the third set of instructions is adapted to control the wireless telephone to store the converted font data and the mask in the cache according to each one of a font type.

11. A computer readable medium of instructions as claimed in claim 8, wherein the third set of instructions is adapted to control the wireless telephone to store the converted font data and the mask in the cache according to each one of a font type.

12. A computer readable medium of instructions as claimed in claim 8, wherein the third set of instructions is adapted to control the wireless telephone to store the converted font data as a white colored font.

13. A computer readable medium of instructions as claimed in claim 8, wherein the fifth set of instructions is adapted to control the wireless telephone to provide color to the converted font data.

14. A computer readable medium of instructions as claimed in claim 8, wherein the first set of instructions is adapted to control the wireless telephone to provide characters from the converted font data.

* * * * *